United States Patent
Zaguroli, Jr.

(10) Patent No.: US 10,900,559 B2
(45) Date of Patent: Jan. 26, 2021

(54) AUTOMATIC LUBRICATION ARRANGEMENT FOR A HOIST

(71) Applicant: James Zaguroli, Jr., Auburn Hills, MI (US)

(72) Inventor: James Zaguroli, Jr., Auburn Hills, MI (US)

(*) Notice: Subject to any disclaimer, the term of this patent is extended or adjusted under 35 U.S.C. 154(b) by 324 days.

(21) Appl. No.: 16/108,711

(22) Filed: Aug. 22, 2018

(65) Prior Publication Data

US 2019/0368598 A1 Dec. 5, 2019

Related U.S. Application Data

(60) Provisional application No. 62/678,502, filed on May 31, 2018.

(51) Int. Cl.
| | |
|---|---|
| *F16H 57/05* | (2006.01) |
| *B66D 1/28* | (2006.01) |
| *B66D 3/26* | (2006.01) |
| *F16H 57/04* | (2010.01) |
| *B66D 3/16* | (2006.01) |

(52) U.S. Cl.
CPC ............ *F16H 57/05* (2013.01); *B66D 1/28* (2013.01); *B66D 3/16* (2013.01); *B66D 3/26* (2013.01); *F16H 57/041* (2013.01); *B66D 2700/023* (2013.01)

(58) Field of Classification Search
CPC . F16H 57/05; F16H 57/041; B66D 2700/023; B66D 1/28; B66D 3/26; F16N 2210/33
USPC ........................................................ 184/15.1
See application file for complete search history.

(56) References Cited

U.S. PATENT DOCUMENTS

| | | | | | |
|---|---|---|---|---|---|
| 2,489,442 | A | * | 11/1949 | Whiting .................... | B61K 3/02 184/3.2 |
| 2,637,411 | A | * | 5/1953 | Harbison ................. | B61K 3/02 184/3.2 |
| 2,655,222 | A | * | 10/1953 | Warwick ................... | B66D 3/26 184/15.1 |
| 2,726,688 | A | * | 12/1955 | Flood ...................... | B27B 13/12 83/169 |
| 2,866,521 | A | * | 12/1958 | Gibson ..................... | B61K 3/02 184/3.2 |
| 2,903,090 | A | * | 9/1959 | Brown ...................... | B61K 3/02 184/3.2 |
| 4,811,818 | A | * | 3/1989 | Jamison ................... | B61K 3/02 105/463.1 |
| 4,915,195 | A | * | 4/1990 | Dial ......................... | B61K 3/00 184/3.2 |
| 4,991,262 | A | * | 2/1991 | Brun ....................... | D01G 15/24 184/101 |
| 5,054,582 | A | * | 10/1991 | Aracil ...................... | B61K 3/00 184/3.2 |
| 5,251,724 | A | * | 10/1993 | Szatkowski .............. | B61K 3/02 184/3.2 |

(Continued)

*Primary Examiner* — Michael R Mansen
*Assistant Examiner* — Mark K Buse
(74) *Attorney, Agent, or Firm* — John R. Benefiel

(57) ABSTRACT

An automatic lubricating arrangement for a chain hoist in which a lubricating body is inserted in a downwardly angled hole in a fixed structure enclosing a rotary drive member engaging the chain. The lower end of lubricating body rubs a surface on the rotary drive member to deposit lubricant thereon as the drive member is rotated, which lubricant body is pushed laterally along and onto adjacent chain links.

2 Claims, 3 Drawing Sheets

(56) References Cited

U.S. PATENT DOCUMENTS

| | | | | |
|---|---|---|---|---|
| 5,305,853 | A * | 4/1994 | Ross | B61K 3/02 |
| | | | | 184/3.2 |
| 5,337,860 | A * | 8/1994 | Burke | B61K 3/02 |
| | | | | 184/3.2 |
| 7,108,104 | B2 * | 9/2006 | Mitrovich | B61K 3/02 |
| | | | | 184/15.1 |
| 7,467,723 | B2 * | 12/2008 | Zaguroli, Jr. | B66C 9/14 |
| | | | | 212/331 |
| 9,702,462 | B2 * | 7/2017 | Celik | F16J 15/00 |
| 10,099,904 | B1 * | 10/2018 | Zaguroli, Jr. | B66D 1/54 |
| D873,319 | S * | 1/2020 | Mitrovich | D15/150 |
| 2003/0101897 | A1 * | 6/2003 | Mitrovich | B61K 3/02 |
| | | | | 104/279 |
| 2004/0238282 | A1 * | 12/2004 | Mitrovich | B61K 3/02 |
| | | | | 184/3.2 |
| 2010/0006808 | A1 * | 1/2010 | Weingartner | F16H 55/303 |
| | | | | 254/372 |
| 2012/0037455 | A1 * | 2/2012 | Bennstedt | B61K 3/02 |
| | | | | 184/3.2 |
| 2015/0314998 | A1 * | 11/2015 | Ishikawa | B66D 3/16 |
| | | | | 254/358 |
| 2019/0092607 | A1 * | 3/2019 | Zaguroli, Jr. | B66C 15/02 |

* cited by examiner

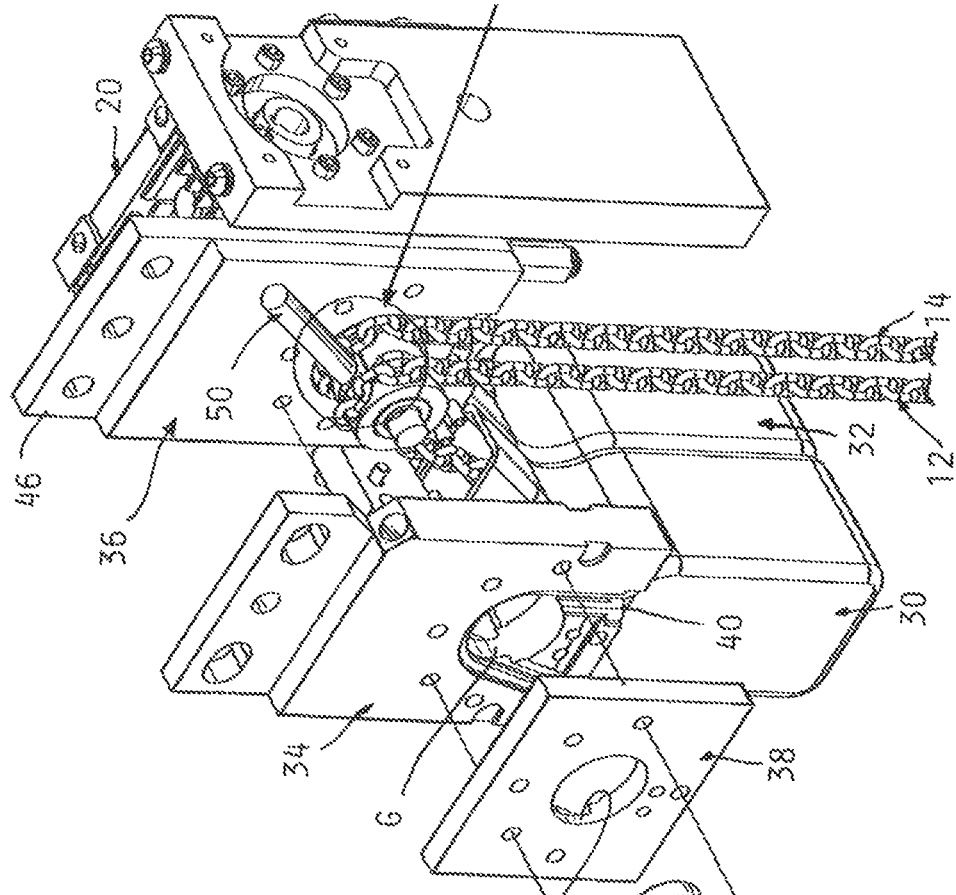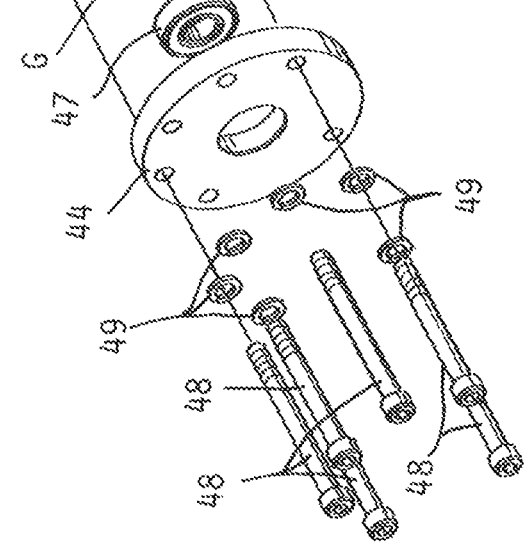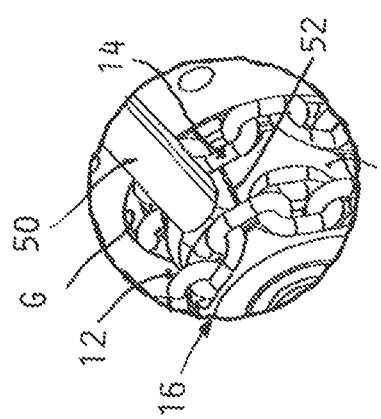

AUTOMATIC LUBRICATION ARRANGEMENT FOR A HOIST

CROSS REFERENCE TO RELATED PATENT APPLICATION

This application claims the benefit of U.S. provisional application 62/678,502 filed on May 31, 2018.

BACKGROUND OF THE INVENTION

This invention concerns hoists and particularly hoists using a wrappable lift element such as a chain to lift loads. If such hoists are in constant heavy use, such as in factory production, it has been found to be advantageous to periodically lubricate the chain or other lift element to reduce wear and thereby extend the service life of the hoist chain.

Particularly where heavy loads are being lifted, the contact between the links and with the driving and guiding surfaces will create significant wear on the chain. Adequate lubrication is an important concern since a rapidly wearing chain may cause a failure of the chain before the end of the expected service life of the chain.

This has in the past been prevented by frequently applying lubricant to the chain at regular service intervals. This is a burdensome requirement and is easily overlooked, and apt to be neglected in busy operations.

Co-pending application Ser. No. 15/727,710 filed on Oct. 9, 2017, and incorporated herein by reference, describes a hoist which includes a main chain driven up and down to lift and lower a load supported by the chain, but also a safety chain which automatically assumes the support of a load held by a main chain if the main chain breaks. This greatly reduces the risk presented by an unexpected failure of a worn chain, but regular lubrication is still desirable to maximize the service life of the main chain to reduce costs and the amount of time devoted to maintenance, as well as avoiding the down time needed to replace a chain as a result of a breakage.

It is desirable that an arrangement for automatic lubrication of a hoist chain be provided, which would be simple and reliable so as to not result in an unexpected failure of the main chain caused by insufficient lubrication.

It is an object of the present invention to provide an automatic lubrication arrangement for lubricating a hoist chain over a substantial period of use of the hoist to thereby minimize the time necessary to reliably provide lubrication of the chain without requiring frequent manual application of a lubricant to the chain or other lift element.

SUMMARY OF THE INVENTION

The above recited object of the invention and other objects which will be understood by those skilled in the art are achieved by deposit of a lubricant onto the chain as the chain moves up and down to raise and lower the load by mounting an elongated body of a solid lubrication material so as to contact a surface on a drive member which relatively moves when the hoist is operated such as a sprocket of a conventional chain drive to cause lubricant material to be rubbed off and deposited onto a surface adjacent the hoist chain. The deposited lubricant is pushed laterally onto the chain by continuing rubbing off of lubricant to lubricate the chain every time the hoist is operated.

The body of a solid lubricant material is preferably comprised of a commercially available stick of graphite material which is worn down and deposits lubricant onto the moving surface of the drive member adjacent the chain.

Other commercially available lubrication bodies may also be used and are conventionally employed to lubricate, dies, etc, which comprise a relatively softer stick of lubricant contained within a paper sleeve maintaining the shape of the lubricant body which also will be worn down by engagement with the moving surface of a drive member to rub off and deposit lubricant onto the surface next to the chain which is thereafter pushed lateral onto the chain by continued accumulation of lubrication material.

The drive member surface may be defined on a rotary chain drive member having drive features adjacent the surface onto which the lubricant is deposited, coating successive chain links as the hoist is operated.

The moving surface onto which lubricant is rubbed may have one or more laterally extending cross grooves or other features tending to scrape off lubricant material from the end of the lubricant body when engaging the end thereafter to thereafter push lubricant rubbed off the lubrication body onto the chain as the chain moves up and down to raise or lower the load.

The mounting may comprise a through hole formed in a fixed partially surrounding structure which has recesses configured to guide the moving hoist chain as it is driven up and down by the sprocket. The hole terminates at the contacted surface so as to cause lubricant to be deposited thereon, which is then pushed laterally onto the chain by the further accumulation of rubbed lubricant. The hole is preferably angled in a downward direction so that gravity provides a moderate force which force maintains the end of the lubrication body in constant contact with the surface as the lubricant body wears down. The hole has a diameter sized to slidably hold the lubricant body.

The presence of the lubricant body thus continues to lubricate the chain as it is repeatedly worn down over an extended service period of the hoist so as to eliminate the need for frequent manual lubrication of the chain.

DESCRIPTION OF THE DRAWING FIGURES

FIG. 2 is an exploded perspective view of additional components of a chain hoist to be equipped with an automatic lubrication system according to the present invention.

FIG. 3 is an enlarged view of the components within the circle on FIG. 2 to show certain details of components of the automatic lubrication system according to the invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

This application concerns hoists in which a hoist drive element such as a chain is driven up and down to lift or lower a load connected to the chain and in which a lubricant may be applied to the chain automatically to reduce the rate of chain wear while not requiring frequent manual lubrication of the chain.

The present inventor has heretofore invented a hoist which is provided with a safety feature including a safety chain in addition to a main drive chain which is normally in a slack condition and does not support any portion of the weight of the load, but will automatically support all of the weight of the load if the main chain breaks, as described in the co-pending U.S. Ser. No. 15/727,710 filed on Oct. 9, 2017 and referenced above.

The present application describes an automatic hoist chain lubrication arrangement added to the hoist as described in that application. However, it should be understood the present invention may be applied to other hoists which use an element driven by a rotary drive member to lift and lower loads which are subject to friction induced wear.

Figure 1:
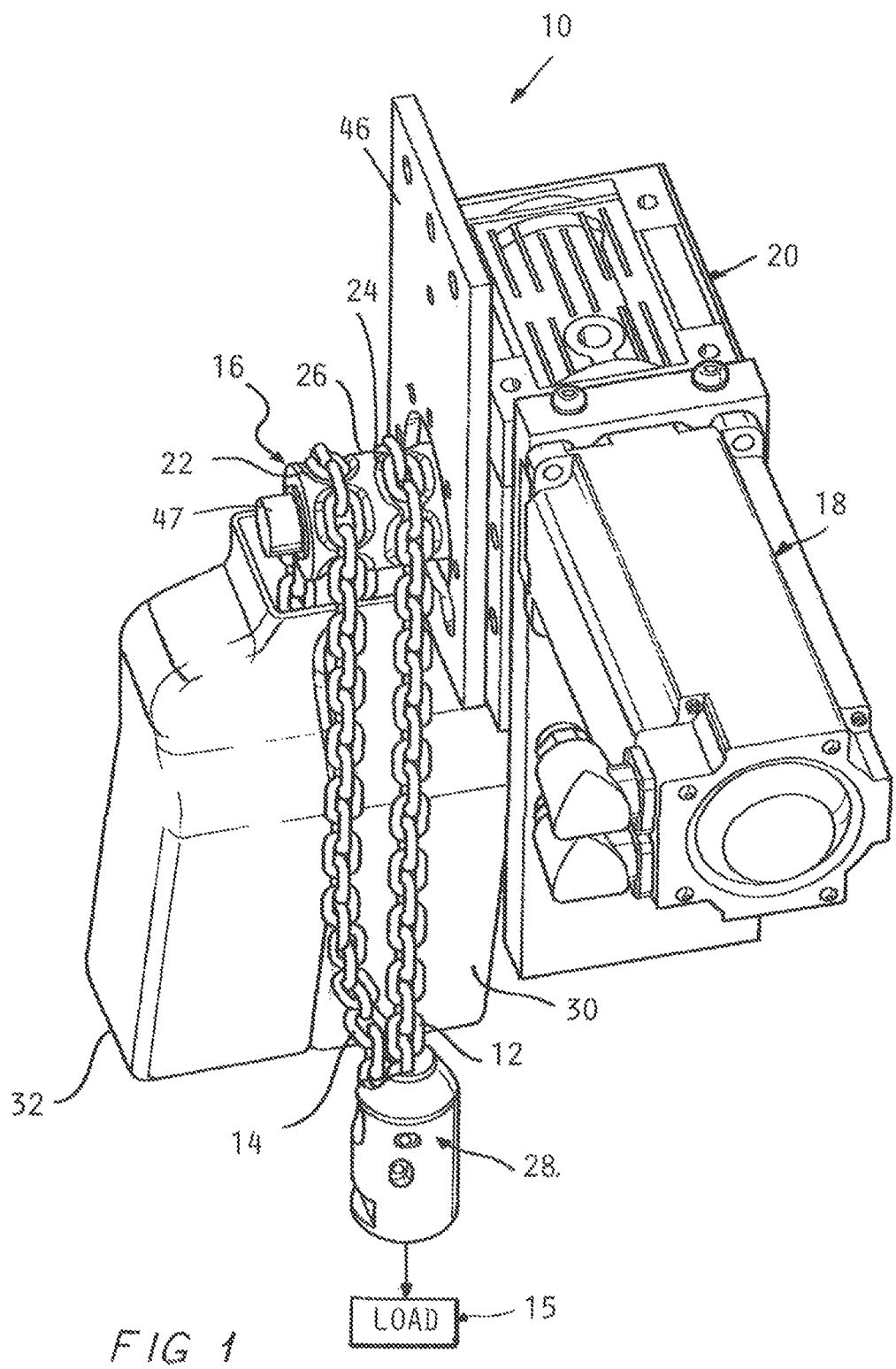
FIG. 1 is a perspective view from the front of some of the components of a chain hoist to be equipped with an automatic lubrication arrangement according to the present invention.
Figure 4:
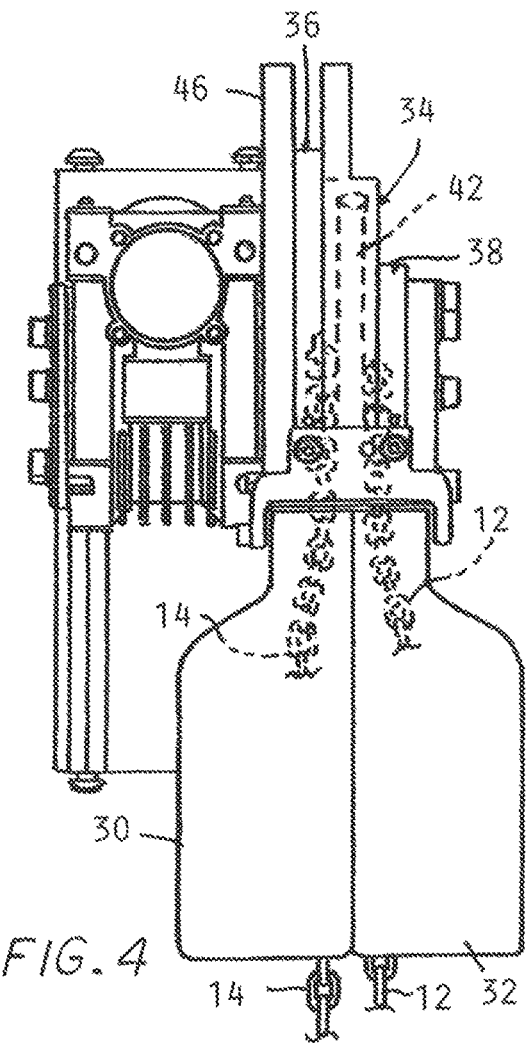
FIG. 4 is a front view of certain components of the hoist shown in FIG. 2.
Figure 5:
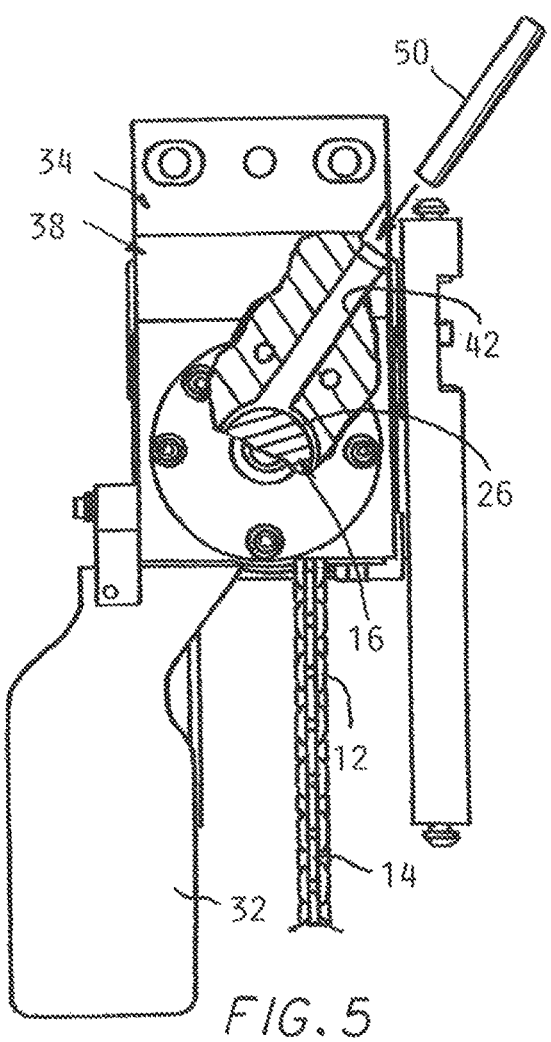
FIG. 5 is a side view in partial section of the components of the hoist as shown in FIG. 4.
Figure 6:
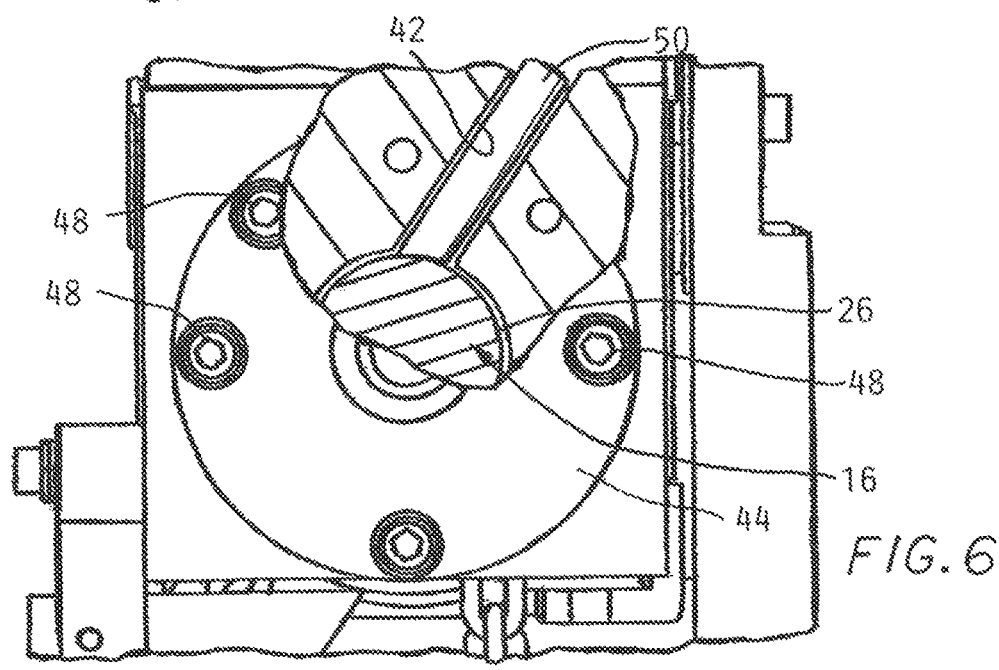
FIG. 6 is an enlarged fragmentary and partially sectional side view of the hoist components shown in FIG. 5.

Referring to FIG. 1, components of a chain hoist 10 described in the above referenced U.S. patent application are shown, including a main chain 12 and a safety chain 14 which are both simultaneously driven by a rotary drive member comprised of a sprocket 16 which is rotated by an electric motor 18 and gearing unit 20 which is connected to the sprocket 16 by a mounting plate 46 bolted to the gearing unit 20. The sprocket 16 has a shaft keyed to a gearing unit output sleeve (not shown) in the well known manner. A stack of rectangular plates 34, 36, 38 comprising a fixed structure each have internal openings G which together with pockets 22, 24 in the rotary sprocket 16 capture and guide the links of chains 12, 14 which are partially wrapped around sprocket 16 as they are driven into and out of receptacles 30, 32, which chain drive has been used for many years and is well known in the art.

In the present embodiment, sprocket 16 side by side series of pockets 22, 24, each series offset from each other and spaced laterally apart, with an intervening smooth circumferential surface 26.

As mentioned above, the series of fixed stacked plates 34, 36, 38 pairs of which are each formed with aligned pair of cavities G which are with respective sets of pockets 22, 24 on the sprocket 16 arranged around the diameter of the sprocket 16 which hold each of the links of the chains 12, 14 as they are passed around the axis of the sprocket 16 in order to positively maintain the relative position of the two chains 12 and 14 as well as drive the chains 12, 14 up and down.

This arrangement for driving a single chain is well known in the art.

The main chain 12 is normally under tension since by design it bears the entire weight of the load 15 to which both chains are connected. The main chain 12 has a lower end connected to a chain nest 28 to be centrally disposed therein, the chain nest 28 in turn being connected to a load 15 which is aligned with the main chain 12.

The safety chain 14 also has a lower end secured to the nest 28, located right next to the main chain 12. This causes it to be slightly offset, in a side by side relationship with the main chain 12. The length of safety chain 14 from the nest 28 to the sprocket 16 is slightly longer than the length of the main chain 12 so as to normally be in a slack condition as depicted in FIG. 1. Thus, the safety chain 14 normally does not bear any portion of the weight of the load 15 and therefore is not subject to appreciable wear, unlike the main chain 12 which often is heavily loaded and therefore its links are subject to significant wear and need to be lubricated.

Both chains 12, 14 have upper ends which are collected in a respective one of the pair of chain receptacles 30, 32 as the load 15 is lifted by rotation of the sprocket 16 in one direction, to raise the upper parts of both of the chains 12, 14, which are collected in the respective receptacles 30, 32. The load 15 is lowered by rotation of the sprocket 16 in the opposite direction, both chains 12, 14 are advanced out of a respective receptacle 30, 32. Again, the safety chain 14 normally does not bear any part of the weight of the load 15 as it is raised and lowered.

However, if the main chain 12 breaks, the safety chain 14 is almost instantly brought into tension since it then assumes the total weight of the load 15 as soon as the slight slack is taken up by a slight movement of load 15 to thereby prevent the load 15 from dropping appreciably.

According to the present invention and unlike the hoist described in the cross referenced patent application, the center plate 34 of the series of stacked plates 34, 36, 38 is made thicker than the other stacked plates 36, 38 (FIG. 2) which are captured and securely held together in abutment with a respective side of the center plate 34 by bolts 48 lock washers 49 and an end plate 44. A bearing 47 supports the outer end of the sprocket 16.

The two abutting sides of the fixed plates 34, 36, 38 are formed with matched machined recesses 40 machined into the openings G, only one clearly visible in FIG. 2, configured to guide the links of the respective chains 12, 14 as they are moved around the axis of the sprocket 16 to insure that the links of the chains 12, 14 remain in position in the pockets 22, 24. The chain links are also received in a circumferentially extending series of drive features comprised of pockets 22, 24 formed in the sprocket 16 which upon rotation of the sprocket 16 cause both of the chains 12, 14 to be advanced in either direction.

The extra thickness of plate 34 allows a downwardly angled through hole 42 to be drilled therein terminating just above the smooth surface 26 of the sprocket 16 located between the sets of pockets 22, 24. The plate 34 comprises a fixed structure covering the sprocket 16 and able to hold a lubrication body 50 stationary as the sprocket 16 rotates.

A circular end plate 44 is bolted to an attachment plate 46 and connects the same to gear unit 20 by long bolts 48 and lock washers 69 to engage and locate the sprocket 16 as described in the referenced patent application.

The sprocket 16 has a drive shaft connected thereto (not shown) which is inserted in an output sleeve element (also not shown) of the gear unit 20 and keyed thereto be rotated by the motor 18 in the well known manner.

The lubrication body 50 is inserted into the angled hole 42 from above, which is sized to be readily slidable therein, gravity urging it downwardly and bringing its leading end into contact with the circumferentially extending intermediate surface 26 defined on the outside diameter of the sprocket 16.

Lubrication sticks are typically 0.5 inches in diameter and are used in die making and for various other lubrication purposes may be used as they are readily available commercially. Graphite sticks are preferred to be used due to having a relatively long life of and effectively lubricating the chain links for extending periods.

The pressure of the lubricant body 50 exerted on the surface 26 by its own weight is moderate, and varies with the inclination of the angled hole 42 so that a modest gravity force can be achieved to cause the proper rate of rub off of lubricant. No spring or other device is necessary, to thereby enhance the reliability of the lubrication arrangement, although such a spring could be employed if desired, if so, the up and down angled orientation of the hole 42 is not required.

Adequate clearance between the lubricant body 50 and the wall of the hole 42 should be provided to insure free movement, gravity gently urging the body 50 downward and against the circumferential sprocket surface 26. The angle of the hole 42 affects the magnitude of the gravity force urging the body 50 against the surface 26 of the sprocket 16. A lower force will reduce the amount of lubricant to make the lubricant last longer while a greater amount of lubricant will be deposited on the chains 12, 14 with an increased effective gravity force as will be understood by those skilled in the art.

The surface 26 can be formed with one or more shallow laterally extending grooves 52 (FIG. 3) to increase the rate at which lubricant is rubbed off onto the surface 26.

An angle of 55° has been found to function well for depositing a proper quantity of lubricant from a solid graphite body 50, while not requiring a too frequent replacement of the lubricant body 50.

The invention claimed is:

1. A hoist including an automatic hoist chain lubricating arrangement for lubricating a hoist chain included in said hoist supporting a load in which successive links of said chain are engaged and driven by a rotary drive member to raise and lower said load;

a hole formed in an upper part of a fixed structure and extending down to a circumferentially extending surface of said drive member; and, a body of a lubricating material slidably received in said hole so that gravity urges said body to rub against said surface upon rotation of said rotary drive member, causing lubricant from said body to be rubbed off onto said surface as said surface rotates past said stationary lubricant body, to thereby automatically lubricate said chain links during operation of said hoist and movement of said links of said chain past said end of said lubricant body;

said hoist having a first chain and a separate second chain extending alongside said main chain, said chains both simultaneously driven by said rotary drive member by two separate circumferential series of drive features arranged around a perimeter of said rotary drive member, said series of drive features separated by said circumferential surface interposed between said series of drive features, said circumferential lubrication body lower end bearing against said surface solely by the force of gravity acting thereon.

2. The hoist according to claim 1 wherein said circumferential surface of said rotary drive member has one or more grooves extending laterally across a perimeter of said surface tending to increase the rate of scrape off of lubricant from said lubricant body and onto said surface.

* * * * *